United States Patent [19]

Harbert

[11] 3,861,987
[45] Jan. 21, 1975

[54] GAUGE INSTALLATION TOOL

[75] Inventor: Bobby C. Harbert, Waco, Tex.

[73] Assignee: The United States of America as represented by the Secretary of the United Air Force, Washington, D.C.

[22] Filed: Oct. 11, 1973

[21] Appl. No.: 405,722

[52] U.S. Cl. ............ 156/556, 74/479, 156/378, 156/423, 214/1 CM, 269/47
[51] Int. Cl. ......... B25j 1/08, B25j 15/06, B65h 9/08
[58] Field of Search .......... 156/556, 559, 574, 579, 156/580, 598, 293, 378, 391, 423, 497, 536, 156/538, 285, 381; 227/52; 269/47, 21; 29/200 P, 269/200 J; 74/479; 214/1 CM; 173/20; 33/16.13; 294/64 R, 64 A; 73/103

[56] References Cited
UNITED STATES PATENTS

| | | | |
|---|---|---|---|
| 3,071,402 | 1/1963 | Lasto et al. | 294/64 R |
| 3,135,396 | 6/1964 | Grainger | 214/1 CM |
| 3,481,494 | 12/1969 | Walischmiller | 214/1 CM |

Primary Examiner—Edward G. Whitby
Assistant Examiner—J. Gallagher
Attorney, Agent, or Firm—Harry A. Herbert, Jr.; Arsen Tashjian

[57] ABSTRACT

A tool for installing a strain gauge on the inside surface of a solid propellant rocket motor. A main tube having a gauge installing arm pivotally attached to the end thereof is inserted into the rocket motor to a predetermined depth with the strain gauge held in position on the end of the pivot arm by means of a vacuum. The arm is pivoted 90 degrees and extended so that the guage contacts the surface and is bonded thereto with adhesive after which the vacuum is released and the arm realigned and the tube withdrawn.

5 Claims, 2 Drawing Figures

PATENTED JAN 21 1975  3,861,987

GAUGE INSTALLATION TOOL

BACKGROUND OF THE INVENTION

This invention relates to a tool for installing a gauge in a normally inaccessible area and, more particularly, the invention is concerned with providing a device for installing a bonded strain gauge on the inner surface of a solid propellant rocket motor.

The hereinafter disclosed device is designed for the remote installation of strain measuring gauges such as clip gauges on the inside surface of a large-scale solid rocket motor grain. The device is especially useful for installing the clip gauges on the narrowest portion, which would be the bottom, of a solid rocket grain having a star center port configuration with approximately a 15-inch radial dimension to the bottom of the star. Normally, it is required that the entire installation be accomplished through an 8 inch diameter opening in the forward dome of the motor. In addition to being mounted 15 inches down from the center line of the motor in the star valleys, the gauges must be located at varying distances along the longitudinal axis of the motor. These distances can be as much as 70 inches away from the 8 inch diameter hole in the forward dome.

Thus, it can be seen that an important utility of the device is to provide a means for accurately installing strain gauges or other comparable items in a remote location of limited accessibility. In the hereinafter described device, the installation requirements noted above are fully met and the device is relatively simple to operate while at the same time is extremely accurate and dependable to position the gauges in the proper location with the required accuracy.

SUMMARY OF THE INVENTION

The present invention is concerned with providing a gauge installation tool for attaching a clip type strain gauge or the like to the normally inaccessible inner surface of a solid rocket motor propellant grain. The strain gauge is held at the end of a gauge installation arm which is pivotably attached to the end of a main tube. The main tube includes means for controlling the angular position of the gauge installation arm so that it can be pivoted 90° and then removed downward to position the gauge against the surface of the rocket motor grain. The gauge is secured to the motor grain by means of an adhesive and, after the proper pressure is applied causing the adhesive to set, the installation tool is withdrawn from the interior of the rocket motor.

Accordingly, it is an object of the present invention to provide a gauge installation tool suitable for attaching a clip type strain gauge to the inner surface of a rocket motor propellant grain in order to measure the stresses in the structure.

Another object of the invention is to provide an installation tool having a main tube with an installation arm pivotably attached to the inner end thereof. Control means are included for causing the installation arm to pivot 90° and to move downward to position a gauge attached to the free end thereof to contact the inner surface of a rocket motor propellant grain or the like.

Still another object of the invention is to provide a special gauge installation tool having a linear slide potentiometer positioned on the gauge installation arm for indicating the amount of force placed on the gauge as it is pressed against the propellant grain.

A further object of the invention is to provide a special gauge installation tool wherein the main tube which is inserted through the hole in the forward dome of a rocket motor includes calibration marks on the surface thereof to indicate the depth of penetration and also operatively engages a plurality of locking paws which lock the tube in the desired longitudinal location as well as on the center line of the rocket motor.

These and other objects, features and advantages will become more apparent after considering the following description taken in conjunction with the annexed drawings and appended claims.

DESCRIPTION OF A PREFERRED EMBODIMENT

Figure 1:
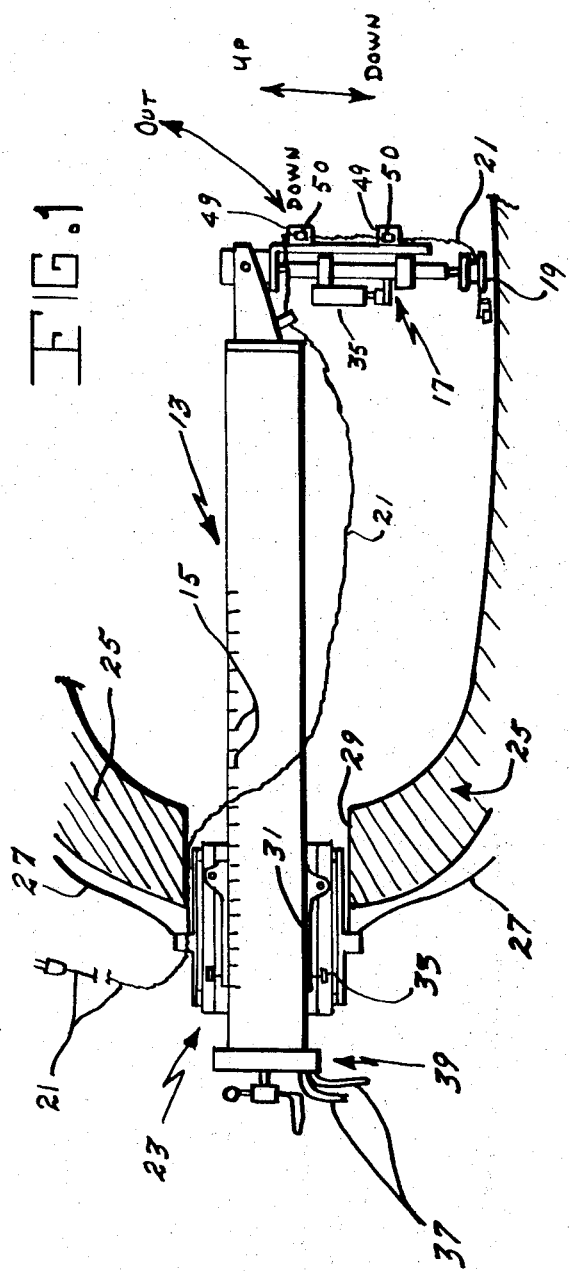
FIG. 1 is a general view of the special gauge installation tool according to the invention shown in position in the rocket motor with the installation arm in the down position.

Referring now to the drawings, the special installation tool includes a main tube 13 having calibration marks 15 engraved thereon. A gauge installation arm 17 is pivotably attached to the inner end of the main tube 13. A clip gauge assembly 19 is held on the lower end of the installation arm 17 by a vacuum or some other suitable means during the position operation. An electronic cable 21 carries the signal from the gauge outside to a suitable recording instrument (not shown).

Around the outer end of the main tube 13, there is positioned a support flange assembly 23 which operates to maintain the installation tool in the proper position relative to the rocket propellant grain 25 of the rocket motor 27. The opening 29 in the forward dome of the rocket motor 27, serves to retain the support flange assembly 23 in position so that the main tube 13 can be properly located in the rocket motor 27. Mounted on support flange assembly 23 are a plurality of locking paws 31 each having an adjustment screw 33 to cause the corresponding paw to move out against the wall of the main tube 13. A linear slide potentiometer 35 is mounted on the gauge installation arm 17 to measure the displacement which is proportional to the force applied to the propellant grain 25 during the installation of the gauge 19. The lead wires 37 carry the signal from the potentiometer 35 outside to a suitable meter (not shown) for supplying the ohms readout which indicates the pressure of the gauge 19 in the propellant grain 25.

Figure 2:
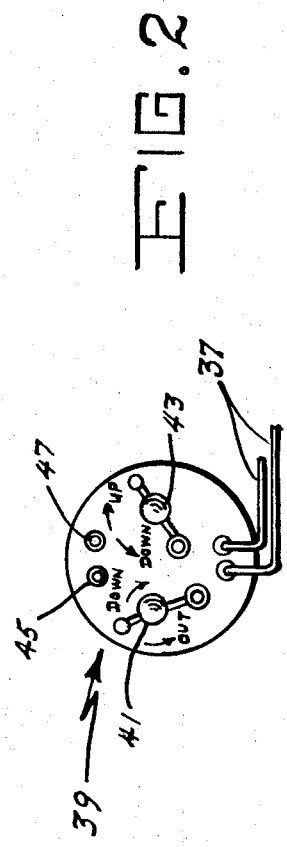
FIG. 2 is a detail view of the outer end of the main tube showing the control apparatus for positioning the gauge on the surface of the rocket motor.

In FIG. 2, the control section 39 of the installation tool includes a first rotatable handle 41 which operates to move the gauge installation arm 17 out into axial alignment with the main tube 13 and down 90° perpendicular to the surface of the propellant grain 25. A second rotatable handle 43 operates to move the gauge installation arm 17 either up or down against the surface of the propellant grain 25 after it has been moved down by the first rotatable handle 41. A flexible shaft (not shown) is connected between the first rotatable handle 41 and a worm gear on the arm 17 to drive it down into the 90° position after which the second rotatable handle 43 remotely operates a screw jack (not shown) mounted on the arm 17 to urge it downward against the inner surface of the propellant grain 25. A vacuum connection 45 is in communication with the clip gauge 19 for holding it until it can be positioned on the surface of the member being measured and a pressure connection 47 communicates with tack cylinders 49 which hold tack pads 50 for retaining the lead wire 21 in position during the strain measuring procedure.

In operation, the gauge installation arm 17 is first oriented in the "out" position, that is, in axial alignment with the main tube 13. The clip gauge 19 and cable tack pads 50 are attached to the arm 17 and held in place using the vacuum holding devices built into the arm. The main tube assembly 13 with the gauge installation arm 17 in the "out" position is inserted through the support flange 23, which was previously attached to hole 29 in the forward dome of the motor 27. The main tube 13 is positioned to the desired depth as determined by the calibration marks 15 on the outside of the tube 13. Three equally spaced support tube locking paws 31 are then moved out against the main tube 13 by the paw adjusting screws 33. This operation not only locks the main tube 13 longitudinally, but also centers the tube 13 along the center line of the motor 27. The tube 13 can then be rotated to any angular position to line up with the desired valley in the propellant grain 25 which may be of star shaped cross sectional configuration.

The gauge installation arm 17 is then cranked down from its horizontal position to the 90° position shown in FIG. 1. The arm 17 is moved into this position through a mechanical arrangement by rotating the handle 41 which turns a flexible shaft (not shown) driving a worm gear reducer remotely. This operation positions the gauge 19 just above the place on the propellant grain 25 where it is to be bonded. The gauge itself is then moved down to contact the surface of the propellant grain 25 by rotating the handle 43 which remotely operates a small screw jack (not shown) mounted on the swing arm 17. The jack is also remotely operated by a flexible shaft. The amount of force placed on the gauge 19 as it is pressed against the propellant grain 25 is measured by the displacement indicated by the linear potentiometer 35 mounted on the swinging arm 17. Displacement starts when the gauge 19 comes in contact with the propellant grain 25 and is resisted by a spring which pushes down on the gauge with a force proportional to the displacement. The adhesive used in bonding the gauge 19 and tack pads 50 to the grain 25 is placed on the gauge feet and pads prior to inserting the installation apparatus inside the motor 27.

After the gauge 19 is set in place, the two tack cylinders 49 are moved out against the starpoint portion of the grain 25 by positive gas pressure through the opening 47 to the tack cylinders 49. The gauge 19 and tack pads 50 are held in this position sufficiently to allow the adhesive to cure. The vacuum from the opening 45 which holds the gauge 19 and tack pads 50 to the installation apparatus is then removed, thus releasing the hold on these parts. The mechanical features previously described in positioning the gauge 19 are then reversed and the installation apparatus removed from the motor.

Although the invention has been illustrated in the accompanying drawing and described in the foregoing specification in terms of a preferred embodiment thereof, the invention is not limited to this embodiment or to the preferred configuration mentioned. It will be apparent to those skilled in the art that my invention could have extensive use in other operations where it is desirable to install gauges in normally inaccessible locations on structures other than the interior of a rocket motor.

Having thus set forth the nature of my invention, what I claim and desire to secure by Letters Patent of the United States is:

1. A gauge installation tool for positioning an article such as an adhesive coated clip gauge in a normally inaccessible location, said installation tool comprising, a main tube for insertion through an opening in a substantially enclosed body with limited accessibility to the interior portion thereof, a gauge installing arm with one end pivotably attached to the inner end of said main tube, means for temporarily holding the adhesive coated gauge on the other end of said gauge installation arm, means at the outer end of said main tube for controlling the angular orientation of said gauge installation arm relative to said main tube, said angular controlling means operating to cause said installation arm to pivot 90° downward and upward, means on the outer end of said main tube for controlling the length of said installation arm, said length controlling means operating to cause said arm to lengthen and press the gauge held thereon against the inside wall of the substantially enclosed body, and means for determining the amount of pressure on said gauge, thereby causing the gauge to become permanently adhesively attached to the inner surface of the substantially enclosed body.

2. The gauge installation tool defined in claim 1 wherein a plurality of calibration marks are engraved on the surface of said main tube to indicate the depth of penetration thereof in the substantially enclosed body.

3. The gauge installation tool defined in claim 1 wherein the adhesive coated gauge is temporarily held on the other end of said gauge installation arm by a vacuum, the vacuum being removed to release the gauge after being bonded to inner surface of the substantially enclosed body.

4. The gauge installation tool defined in claim 3 wherein the means for controlling the length of said gauge installation arm includes a screw jack which causes the adhesive coated gauge to be pressed against the inner wall of the substantially enclosed body.

5. The gauge installation tool defined in claim 3 wherein the means for determining the amount of pressure on the adhesive coated gauge includes a linear potentiometer positioned on said gauge installation arm, the signal from said linear potentiometer being proportional to the pressure applied to the gauge.

* * * * *